(12) United States Patent
Medicherla et al.

(10) Patent No.: US 11,886,396 B2
(45) Date of Patent: Jan. 30, 2024

(54) SYSTEM AND METHOD FOR LEARNING-BASED SYNTHESIS OF DATA TRANSFORMATION RULES

(71) Applicant: Tata Consultancy Services Limited, Mumbai (IN)

(72) Inventors: Raveendra Kumar Medicherla, Bangalore (IN); Sayandeep Mitra, Pune (IN); Ravindra Dinkar Naik, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/982,677

(22) Filed: Nov. 8, 2022

(65) Prior Publication Data

US 2023/0153278 A1 May 18, 2023

(30) Foreign Application Priority Data

Nov. 13, 2021 (IN) .............................. 202121052118

(51) Int. Cl.
*G06F 16/21* (2019.01)
*G06F 40/284* (2020.01)
*G06F 40/30* (2020.01)

(52) U.S. Cl.
CPC .......... *G06F 16/213* (2019.01); *G06F 40/284* (2020.01); *G06F 40/30* (2020.01)

(58) Field of Classification Search
None
See application file for complete search history.

(56) References Cited

U.S. PATENT DOCUMENTS 10,387,124 B2   8/2019   Chaudhuri et al.
11,106,861 B2   8/2021   Portisch et al.
(Continued)

FOREIGN PATENT DOCUMENTS

CN   109522319 A        3/2019
EP      1990740 A1  *  11/2008   ....... G06F 17/30292

OTHER PUBLICATIONS

Benbernou, Salima, Xin Huang, and Mourad Ouziri. "Semantic-based and entity-resolution fusion to enhance quality of big RDF data." IEEE Transactions on Big Data 7, No. 2 (2017): 436-450. (Year: 2017).*

(Continued)

*Primary Examiner* — Uyen T Le
(74) *Attorney, Agent, or Firm* — FINNEGAN, HENDERSON, FARABOW, GARRETT & DUNNER, LLP

(57) ABSTRACT

Data migration of an application from source to target information system is a critical step for a successful modernization project. There are few commercial tools available to address the data migration challenge, creation of a data transformation specification is largely a manual, knowledge intensive, and expert driven process. A system and method for learning based synthesis of data transformation rules have been provided. The system is focused on automating important aspects of automatic inference of the transformation specification. The key principles behind the system and method are derived from the observations on how experts use domain, system, and historical mapping knowledge while creating data transformation specifications. The system contains two major components, schema matching and transformation rule program generation. The system uses machine learning, knowledge representation for schema (Continued)

matching and developed rule generator using a deductive synthesizer.

9 Claims, 9 Drawing Sheets

(56) References Cited

U.S. PATENT DOCUMENTS

| | | | |
|---|---|---|---|
| 2009/0150854 A1* | 6/2009 | Elaasar | G06F 8/10 |
| | | | 717/104 |
| 2012/0072886 A1* | 3/2012 | McCabe | G06F 8/31 |
| | | | 717/114 |
| 2019/0258645 A1 | 8/2019 | Crabtree et al. | |
| 2019/0318272 A1* | 10/2019 | Sassin | G06N 5/025 |
| 2020/0250260 A1* | 8/2020 | Portisch | G06F 16/2458 |
| 2021/0232591 A1* | 7/2021 | Portisch | G06F 16/24564 |

OTHER PUBLICATIONS

Yaghmazadeh et al., "Automated Migration of Hierarchical Data to Relational Tables using Programming-by-Example," (2017).

* cited by examiner

SYSTEM AND METHOD FOR LEARNING-BASED SYNTHESIS OF DATA TRANSFORMATION RULES

PRIORITY CLAIM

This U.S. patent application claims priority under 35 U.S.C. § 119 to: Indian Patent Application No. 202121052118 filed on 13 Nov. 2021. The entire contents of the aforementioned application are incorporated herein by reference.

TECHNICAL FIELD

The disclosure herein generally relates to the field of data migration, and, more particularly, to a method and system for learning-based synthesis of data transformation rules.

BACKGROUND

Data migration is a constant in today's information technology (IT) industry, especially in Enterprise Information Systems (EIS), where old legacy applications are migrated to new systems for a better total cost of ownership (TCO) and the business alignment. EIS are the backbone for business operations of the large enterprises such as banks and insurance companies. Due to software maintenance and evolution, these systems undergo several changes making them legacy. To cope with the changing market conditions, enterprises periodically replace their legacy systems with new ones. New applications are either developed from specifications or using commercial off-the-shelf (COTS) product and require data from the legacy systems. Modernizing information systems is a recurring need for large enterprises.

Data migration of an application from source to target information system is a critical step for a successful modernization project. This makes data migration one of the key phases in legacy transformation. Data migration should be correct and seamless to the end-users so that they are not impacted by implementation of the new system. This, coupled with complex system architecture, makes data migration between large EIS a complex and time-consuming task. Failures in data migration often jeopardize the entire legacy transformation.

Though there are many commercial tools available to address the data migration challenge, creation of a data transformation specification is largely a manual, knowledge intensive, and expert driven process.

SUMMARY

Embodiments of the present disclosure present technological improvements as solutions to one or more of the above-mentioned technical problems recognized by the inventors in conventional systems. For example, in one embodiment, a system for learning-based synthesis of data transformation rules, the system comprises an input/output interface, one or more hardware processors, and a memory. The input/output interface provides a source database schema and a target database schema as a first input, wherein the source database schema comprises source tables and respective source fields and the target database schema comprises target tables and respective target fields. The memory is in communication with the one or more hardware processors, wherein the one or more first hardware processors are configured to execute programmed instructions stored in the one or more first memories, to: receive historical data mapping between the source tables and the target tables as a second input, wherein the historical data mapping comprises a plurality of historic transformation rules and a matching list between the source fields and the target fields; assign each field from the source fields and the target fields to a semantic type; categorize the plurality of historic transformation rules as per the semantic type; identify similar rule statements based on structure of operators present therein within each categorized transformation rules and arranging into a plurality of groups; identify rule patterns for each of the plurality of groups by replacing field names and constants with a plurality of symbols; re-arrange the identified rule patterns in a hierarchical order; identify and infer lexical tokens and grammar rules from the hierarchical order; rearrange the identified lexical tokens and grammar rules to form a set of domain specific languages (DSL), wherein the set of DSLs comprises a plurality of DSL syntactic rules for arrangement of a plurality of DSL operators and their parameters; define operator semantics for each of the DSL operator amongst the plurality of DSL operators; define operator parameter annotations configured to assist in rule inferencing, for each operator amongst the plurality of DSL operators; define a ranking for each of the DSL operator based on a usage frequency count of the plurality of DSL operators from the historical data mapping; instantiate, a synthesizer using the set of DSLs, the source database schema, the target database schema, a set of source-target data samples, and a matching list between target and source fields, and a syntax of the DSL operator, defined operator semantics, defined operator parameter annotations and the defined ranking; generate a plurality of candidate data transformation rules by the synthesizer, wherein the each of generated transformation rules amongst the plurality of candidate data transformation rules are represented as respective programs; rank each program using a score assigned to each DSL operator in the set of DSLs, wherein a higher score is assigned to operators which have a higher frequency of use in the historical data mapping as compared to operators which have lower frequency of use; and select a set of candidate data transformation rules out of the plurality of candidate data transformation rules based on a top user-defined number of rankings.

In another aspect, a method for learning-based synthesis of data transformation rules is provided. Initially, a source database schema and a target database schema are provided as a first input, wherein the source database schema comprises source tables and respective source fields and the target database schema comprises target tables and respective target fields. In the next step, historical data mapping between the source tables and the target tables is received as a second input, wherein the historical data mapping comprises a plurality of historic transformation rules and a matching list between the source fields and the target fields. Further each field from the source fields and the target fields are assigned to a semantic type. In the next step, the plurality of historic transformation rules is categorized as per the semantic type. Similar rule statements are then identified based on structure of operators present therein within each categorized transformation rules and arranging into a plurality of groups. In the next step, rule patterns are identified for each of the plurality of groups by replacing field names and constants with a plurality of symbols. The identified rule patterns are then rearranged in a hierarchical order. In the next step, lexical tokens and grammar rules are identified and inferred from the hierarchical order. The identified lexical tokens and grammar rules are then rearranged to form a set of domain specific languages (DSL), wherein the set of DSLs comprises a plurality of DSL syntactic rules for arrangement of a plurality of DSL operators and their parameters. In the next step, operator semantics are defined for each of the DSL operator amongst the plurality of DSL operators. Further, operator parameter annotations configured to assist in rule inferencing, are defined for each operator amongst the plurality of DSL operators. In the next step, a ranking is defined for each of the DSL operator based on a usage frequency count of the plurality of DSL operators from the historical data mapping. Further a synthesizer is instantiated using the set of DSLs, the source database schema, the target database schema, a set of source-target data samples, and a matching list between target and source fields, and a syntax of the DSL operator, defined operator semantics, defined operator parameter annotations and the defined ranking. A plurality of candidate data transformation rules is then generated by the synthesizer, wherein the each of generated transformation rules amongst the plurality of candidate data transformation rules are represented as respective programs. Each program is then ranked using a score assigned to each DSL operator in the set of DSLs, wherein a higher score is assigned to operators which have a higher frequency of use in the historical data mapping as compared to operators which have lower frequency of use. And finally, a set of candidate data transformation rules is selected out of the plurality of candidate data transformation rules based on a top user-defined number of rankings.

In yet another aspect, one or more non-transitory machine-readable information storage mediums comprising one or more instructions which when executed by one or more hardware processors cause learning-based synthesis of data transformation rules is provided. Initially, a source database schema and a target database schema are provided as a first input, wherein the source database schema comprises source tables and respective source fields and the target database schema comprises target tables and respective target fields. In the next step, historical data mapping between the source tables and the target tables is received as a second input, wherein the historical data mapping comprises a plurality of historic transformation rules and a matching list between the source fields and the target fields. Further each field from the source fields and the target fields are assigned to a semantic type. In the next step, the plurality of historic transformation rules is categorized as per the semantic type. Similar rule statements are then identified based on structure of operators present therein within each categorized transformation rules and arranging into a plurality of groups. In the next step, rule patterns are identified for each of the plurality of groups by replacing field names and constants with a plurality of symbols. The identified rule patterns are then rearranged in a hierarchical order. In the next step, lexical tokens and grammar rules are identified and inferred from the hierarchical order. The identified lexical tokens and grammar rules are then rearranged to form a set of domain specific languages (DSL), wherein the set of DSLs comprises a plurality of DSL syntactic rules for arrangement of a plurality of DSL operators and their parameters. In the next step, operator semantics are defined for each of the DSL operator amongst the plurality of DSL operators. Further, operator parameter annotations configured to assist in rule inferencing, are defined for each operator amongst the plurality of DSL operators. In the next step, a ranking is defined for each of the DSL operator based on a usage frequency count of the plurality of DSL operators from the historical data mapping. Further a synthesizer is instantiated using the set of DSLs, the source database schema, the target database schema, a set of source-target data samples, and a matching list between target and source fields, and a syntax of the DSL operator, defined operator semantics, defined operator parameter annotations and the defined ranking. A plurality of candidate data transformation rules is then generated by the synthesizer, wherein the each of generated transformation rules amongst the plurality of candidate data transformation rules are represented as respective programs. Each program is then ranked using a score assigned to each DSL operator in the set of DSLs, wherein a higher score is assigned to operators which have a higher frequency of use in the historical data mapping as compared to operators which have lower frequency of use. And finally, a set of candidate data transformation rules is selected out of the plurality of candidate data transformation rules based on a top user-defined number of rankings.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
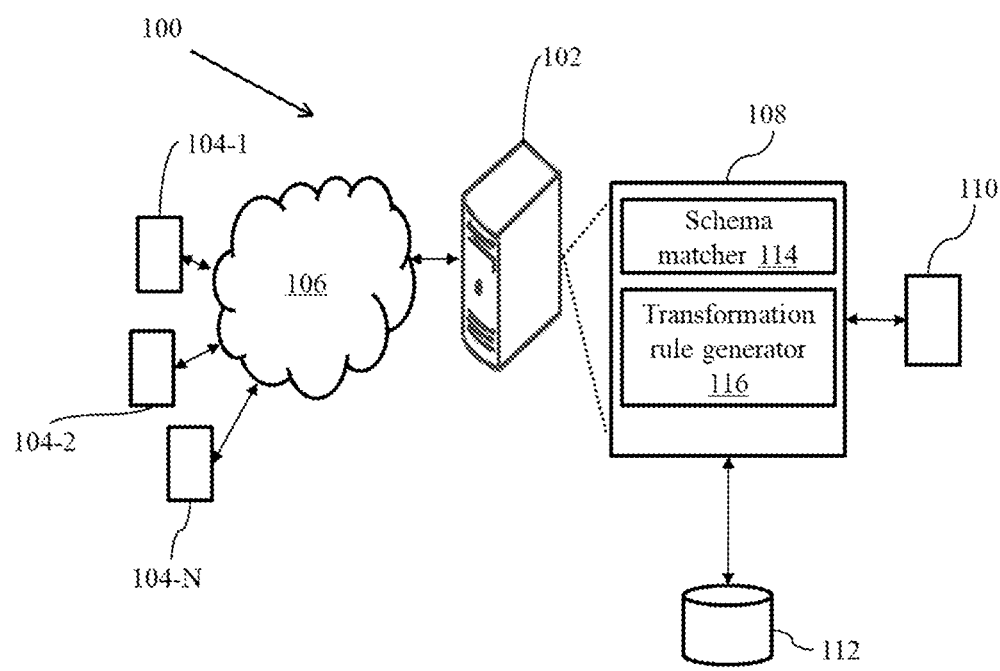
FIG. 1 illustrates a block diagram of a system for learning based synthesis of data transformation rules according to some embodiments of the present disclosure.
Figure 2:
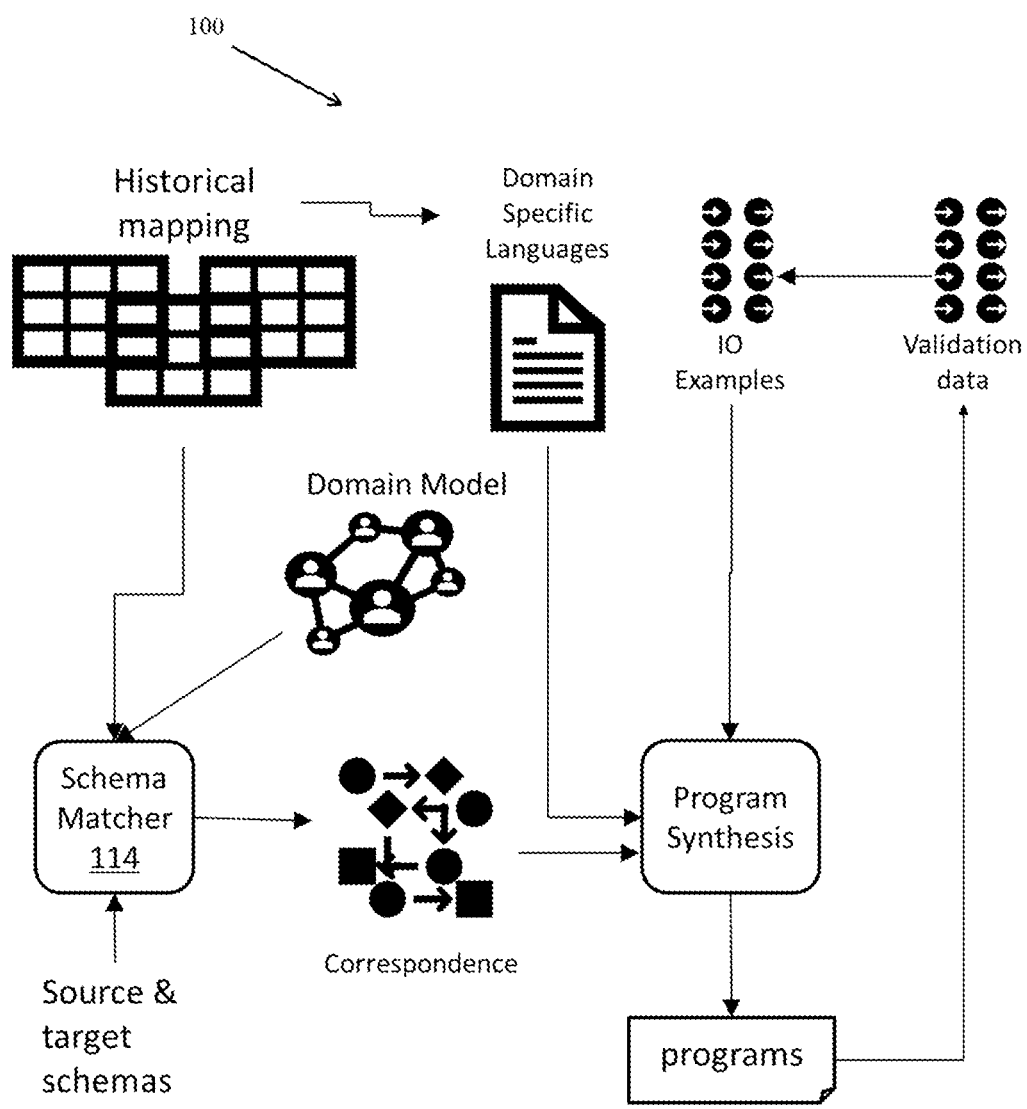
FIG. 2 is a schematic representation of the system of FIG. 1 for learning based synthesis of data transformation rules according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Data migration consists of the following major steps: source data extraction, source data profiling, data cleansing, migration reconciliation, data extraction and data loading. There are several market tools available to assist these steps, e.g., Informatica ETL, Oracle data integrator, etc. Since data transformation is a knowledge intensive process, in order to create its specifications, the data migration experts iteratively use their domain and system knowledge, along with their experience from previous data migrations. Though there are visual assistance tools to capture these specifications, such as Mapforce®, however, they do not provide any assistance by recommending candidate matchings and transformation rules. Though there are few other commercial tools available to address the data migration challenge, creation of a data transformation specification is largely a manual, knowledge intensive, and expert driven process.

The present disclosure provides a system and method for learning based synthesis of data transformation rules. The system is configured to reduce the cognitive load on the experts, time, and also human errors. The present disclosure is focused on automating important aspects of automatic inference of the transformation specification. The key principles behind the system and method are derived from the observations on how experts use domain, system, and historical mapping knowledge while creating data transformation specifications.

Referring now to the drawings, and more particularly to FIG. 1 through FIG. 7C, where similar reference characters denote corresponding features consistently throughout the figures, there are shown preferred embodiments and these embodiments are described in the context of the following exemplary system and/or method.

According to an embodiment of the disclosure, FIG. 1 illustrates a block diagram of a system 100 for learning-based synthesis of data transformation rules. The system 100 contains two major components, schema matching and transformation rule program generation. According to an embodiment of the disclosure, the system 100 uses machine learning, knowledge representation for schema matching and developed rule generator using a deductive synthesizer, a program synthesis using examples framework. This system 100 is configured to increase the efficiency, reduces time required for migration, and minimize human efforts.

It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-A, 104-B . . . , collectively referred to as I/O interface 104 or user interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of units for performing various functions. The plurality of units comprises a schema matcher 114 and a transformation rule generator 116 as shown in the block diagram of FIG. 2.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the system 100 is configured to receive, a source database schema and a target database schema as a first input, via the I/O interface 104. The source database schema comprises source tables and their source fields and the target database schema comprises target tables and their target fields. Similarly, the I/O interface 104 is also configured to provide historical data mapping between the source tables and the target tables as a second input. The historical data mapping comprises a plurality of historic transformation rules.

According to an embodiment of the disclosure, the transformation of specifications has two important steps: schema matching and transformation rule inference. Schema matching is a problem of mapping columns from the old system (source) to the new system (target) if they share a semantic relationship. Transformation rule inference is creating consistent programs which shall convert data from the matched source columns to the corresponding target columns.

According to an embodiment of the disclosure, schema matching is a known technique in the art. One of the techniques for schema matching is explained below. The use of any other schema matching technique well within the scope of this disclosure. In another example, the schema matching can also be done by the expert of this domain.

The schema matching stage takes a source database schema and a target database schema as input. The source database schema containing tables and associated fields with their names, and outputs a mapping between the source fields and the target fields. Specifically, for each target field, it generates a ranked list of source fields, possibly belonging to different source tables, as candidate matches, along with matching scores. The schema matcher 114 utilizes two resources. The first is a knowledge graph capturing structured domain knowledge. This captures domain entities as their nodes and relations between these as edges. The second resource is a collection of historical matches between this target schema and different sources. This contains pairs of fields, one from the target and the other from a source, which have been matched in the past. Using these two resources, the schema matcher 114 is configured to learn the entity match probability for a pair of entities: when the name of a target field mentions the first entity, the probability that the name of its matching source field mentions the second entity. The schema matcher 114 also configured to learn mention probability: the probability of different 'mentions' for an entity in field names. Note that real world field names are complex—a single field name typically mentions multiple related entities. The schema matcher 114 takes on the matching task for a specific new source schema armed with estimates of the entity match probabilities and mention probabilities from historical matches. For each target field, it now computes its field match probability for each candidate source field and ranks all candidates according to these probabilities. The schema matcher 114 calculates this probability for a specific source field in two steps. First, it identifies candidate entities that are mentioned in the two field names. Then it matches mentioned entity pairs between the fields. The field match probability considers both the mention probabilities of entities in the field names and the entity match probabilities of matched entity pairs. Thus, the output of the schema matcher 114 is a matching list between target and source fields.

Once the candidate matches have been generated for the target fields, the expert picks a sample of the match recommendations to review. For each target field in the sample, the expert looks at the top candidates in order, and ticks any one that is the most appropriate match. Once reviewing is completed and the feedback is recorded, the schema matcher is executed again. The schema matcher 114 updates the mention and entity match probabilities for this source based on this feedback, and regenerates the candidate matches for the remaining fields. This process continues until a user defined condition is satisfied.

According to an embodiment of the disclosure, the transformation rule generator 116 takes matching field list as input and produces synthesized data transformation rules as output. However, the matching field list alone is not enough for this task as it cannot describe how source field values are mapped onto target fields. For this, the expert supplies a small sample (3-5) of source and corresponding target field values as example data (S-T data).

With the sample S-T data for each matching pair, transformation rule for the target filed can be generated using program synthesis techniques, where each synthesized program is a transformation rule. In an example, Programming by Examples (PBE) synthesis technique has been used, that uses input/output (i-o) examples as specifications.

In an example, the transformation rule generator 116 have been used on top of a deductive synthesizer for example PROSE, a PBE framework provided by Microsoft. The use of any other deductive synthesizer well within the scope of this disclosure. In order to instantiate a synthesizer, the deductive synthesizer framework requires the following components: a) a grammar design and semantics—domain-specific language (DSL) that defines the syntax and semantics, b) inverse semantic functions that deduce specifications for the parameters of the semantic operators (referred to as operator annotations) which are used in top-down search by the synthesizer, and c) ranking functions for each semantic operator to rank the generated programs.

Grammar design and semantics: The table fields have been organized into different semantic categories, which is referred as semantic types. The semantic type is a representation of a set of values related to a business domain concept.

In an example, 15 semantic types till now have been identified using table fields of the past migration project specifications with the help of migration experts. There is enough scope for the identification more semantic types. Each table field from source and target schema is assigned a semantic type. The transformation rules are organized by semantic type and the rule patterns for each semantic type are identified. The DSL have been designed for each semantic type based on these patterns. The key intuition is that the set of operations on the fields of a specific semantic type is unique, hence requires a separate DSL. For example, consider the DSLs based on String and Date types. Consider an operator "selectWord" of String DSL that selects a word from list of words and operator "subtractDays" of Date DSL that subtract days from a date. Each of these operations are unique in their respective semantic domains. Therefore, rule generator constitutes of 15 synthesizers for 15 semantic types. Depending on the target field's semantic type, the rule generator invokes the associated synthesizer.

Operator annotations: Given an input-output (i-o) specification of the DSL operator, the operator annotation derives the i-o specifications of its parameters. For example, consider split (istr, rg) operator that returns a list of substrings rstr of an input string istr split by regular expression rg. Now, given an i-o example specification of (istr; rstr) for split, the witness function should create all possible example specifications for the parameter rg. Arriving at such witness functions is non-trivial. Consider a given i-o example ("John McGinn", "John") for a field match ("Cust. Name", "First Name"). For the split operator whose second parameter is the regular expression rg used for splitting the input string. The specifications for rg would be f ("John McGinn",'nb'), ("John McGinn", "?McGinn"). The DSL design based on semantic types helped to reduce number of deduction scenarios which in turn reduces the operator annotation design complexity. In addition, domain specific heuristics have also been used to further reduce this complexity.

Ranking: The synthesizer generates multiple consistent programs. This means that each rule, when run on the input from the example, produces the corresponding output in the example. To help the designer, the deductive synthesizer generates ranking score of the synthesized programs using a score assigned to each individual operator in the DSL. A higher score is assigned to those operators which have a greater usage frequency in the historical migrations. The ranking strategy prefers shortest and simplest programs. The transformation rule generator 116 is designed such that the generated rules can be checked against a validation data setup by an expert using a user defined condition. Results of this check can be fed back to the transformation rule generator 116 and the synthesis process undergoes a fresh iteration with enhanced i-o specifications.

Figure 3:
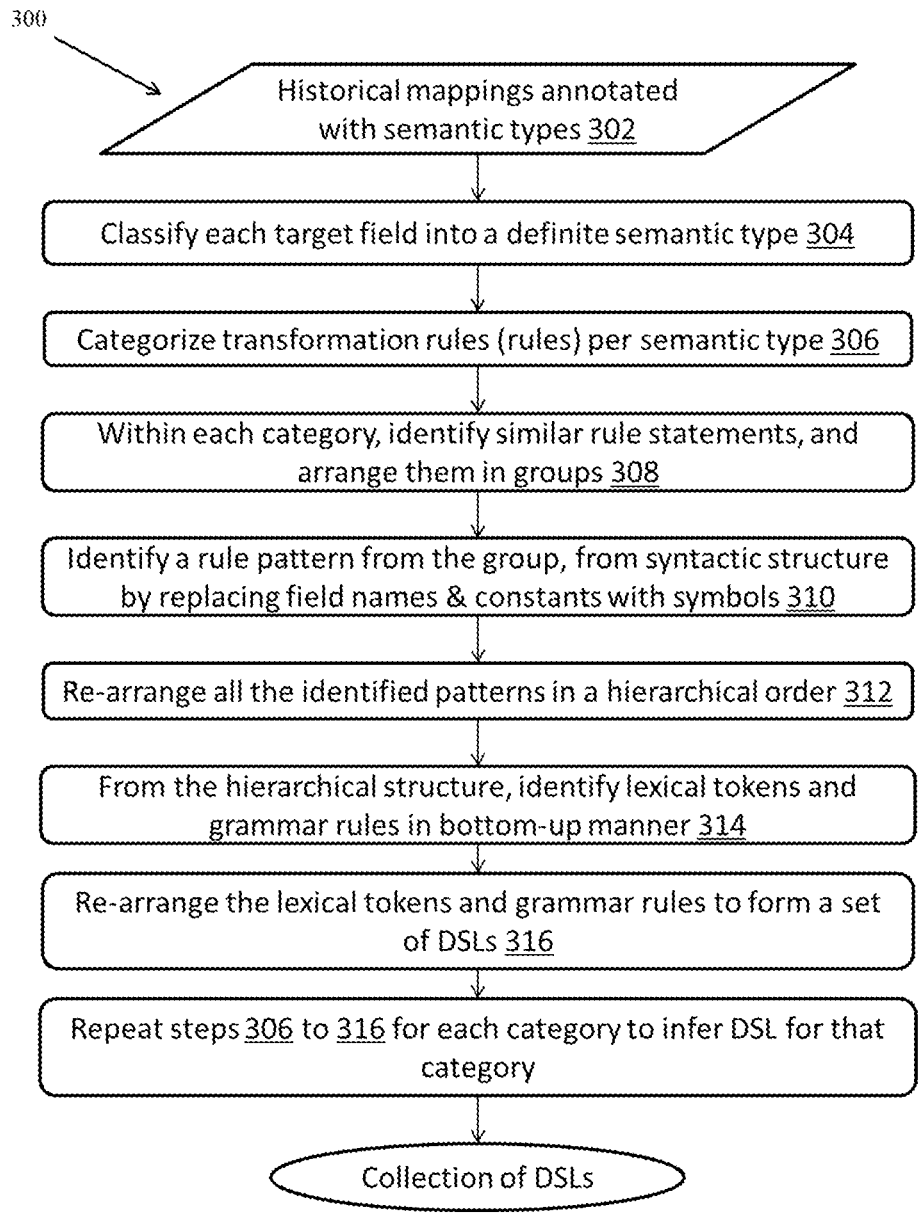
FIG. 3 is a flowchart for the generation of domain specific language (DSL) according to some embodiments of the present disclosure.
Figure 4:
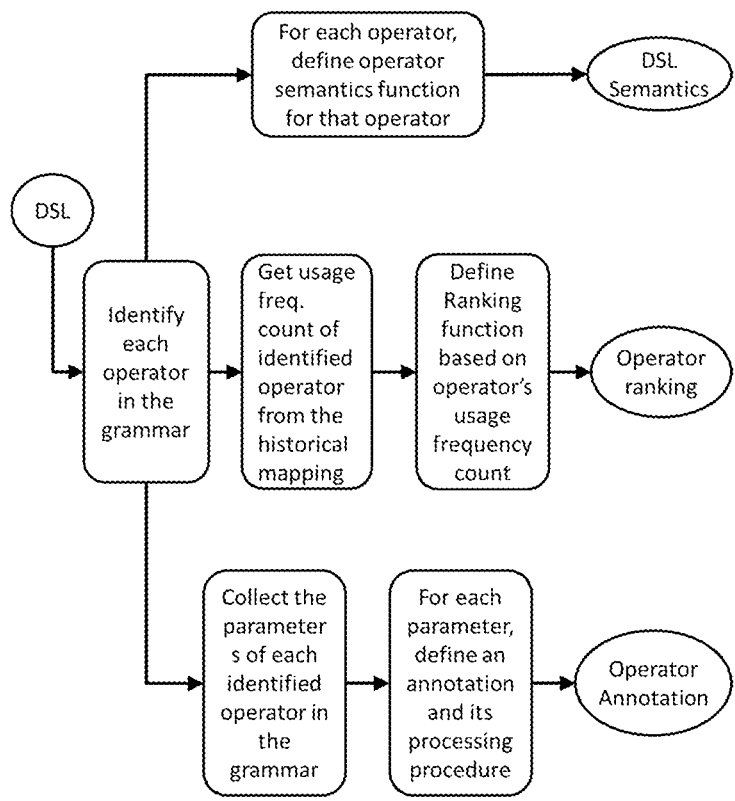
FIG. 4 is schematic representation of utilization of the DSL for defining operator semantics, operator parameter annotations and operator ranking according to some embodiments of the present disclosure.

According to an embodiment of the disclosure, a flow-chart 300 for the generation of domain specific language is shown in FIG. 3. Initially at step 302 a matching list between the source fields and the target fields is received. The matching list comprises historical mapping with semantic types. Further at step 304, each field from the source fields and the target fields are then classified or assigned to a definite semantic type. At step 306, the plurality of historic transformation rules is then categorized as per the semantic type. In the next step 308, similar rule statements are then identified based on structure of operators present therein within each categorized transformation rules and arranging into a plurality of groups. Further at step 310, rule patterns are identified for each of the plurality of groups by replacing field names and constants with a plurality of symbols. At step 312, all the identified rule patterns are rearranged in a hierarchical order. At step 314, lexical tokens and grammar rules are identified and inferred from the hierarchical order. Normally, lexical tokens and grammar rules are identified in a bottom-up manner. Finally, at step 316, the identified lexical tokens and grammar rules are rearranged to form a domain specific language (DSL), wherein the DSL comprises a plurality of DSL syntactic rules for arrangement of DSL operators and their parameters. Steps 306 to 316 can be repeated for each category to infer DSL for that category According to an embodiment of the disclosure, the formed DSL can further be used for defining operator semantics, operator parameter annotations and operator ranking as shown in the schematic representation of FIG. 4. The operator semantics are defined for each of the DSL operator amongst the plurality of DSL operators. Further, the parameters are collected of each identified DSL operator in the grammar. For each parameter, an annotation and its processing procedure is defined. The operator parameter annotations are configured to assist in rule inferencing. A ranking is also defined for each of the DSL operator based on a usage frequency count of the DSL operator from the historical data mapping.

Figure 5:
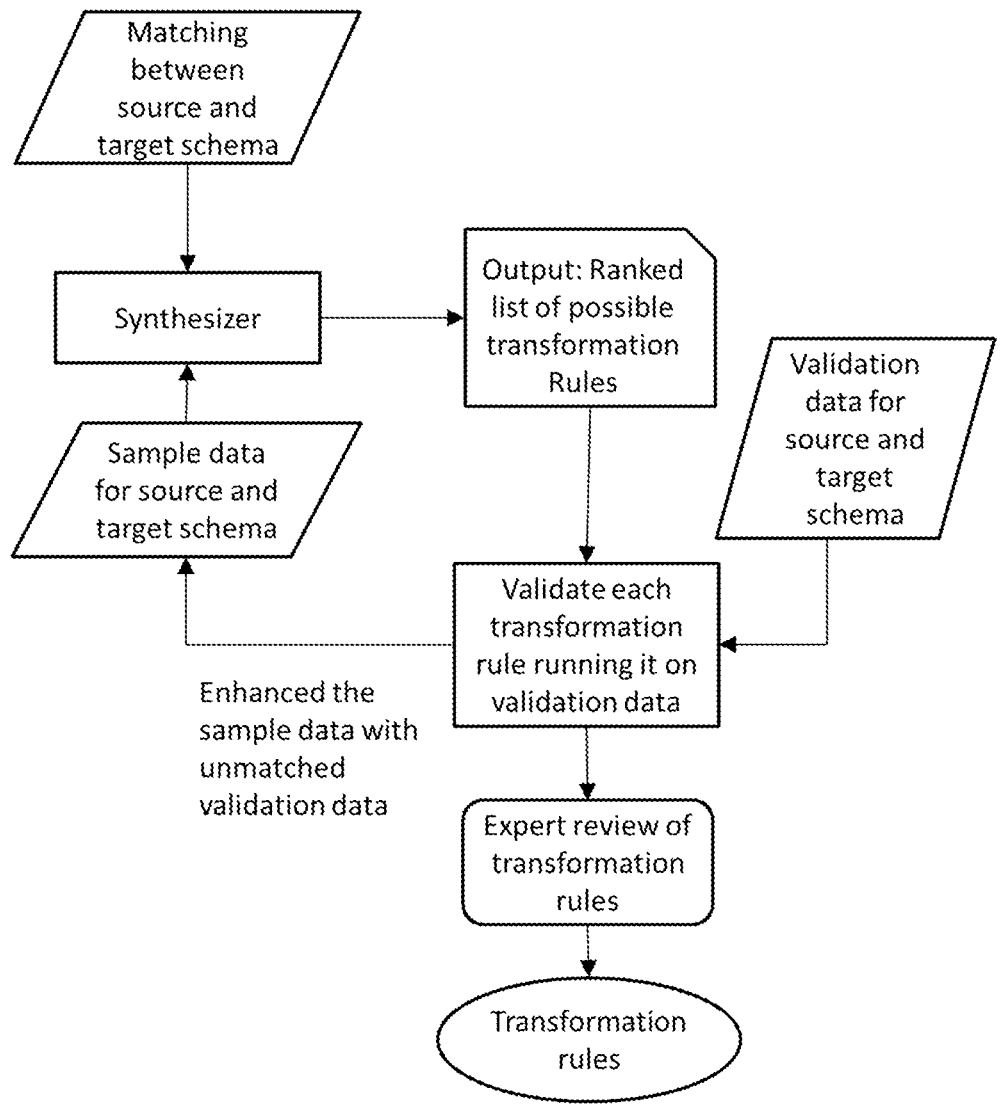
FIG. 5 is a schematic representation of the rule inference process according to some embodiments of the present disclosure.

According to an embodiment of the disclosure, a schematic representation of the rule inference process is shown in FIG. 5. A synthesizer is instantiated using two set of inputs. The first set of input comprises the DSL as generated above, the source database schema, the target database schema provided as the first input, a set of source-target data samples, and the matching list between target and source fields generated by the schema matcher 114. The second set of input comprises a syntax of the DSL operator, defined operator semantics, defined operator parameter annotations and the defined ranking.

According to an embodiment of the disclosure, the synthesizer is configured to generate a plurality of candidate data transformation rules. Each of generated transformation rules amongst the plurality of candidate data transformation rules are represented as respective programs. Each of the transformation rule is then validated by running it on validation data. Further the transformation rules are reviewed by the expert to get the candidate set of transformation rules.

Figure 6:
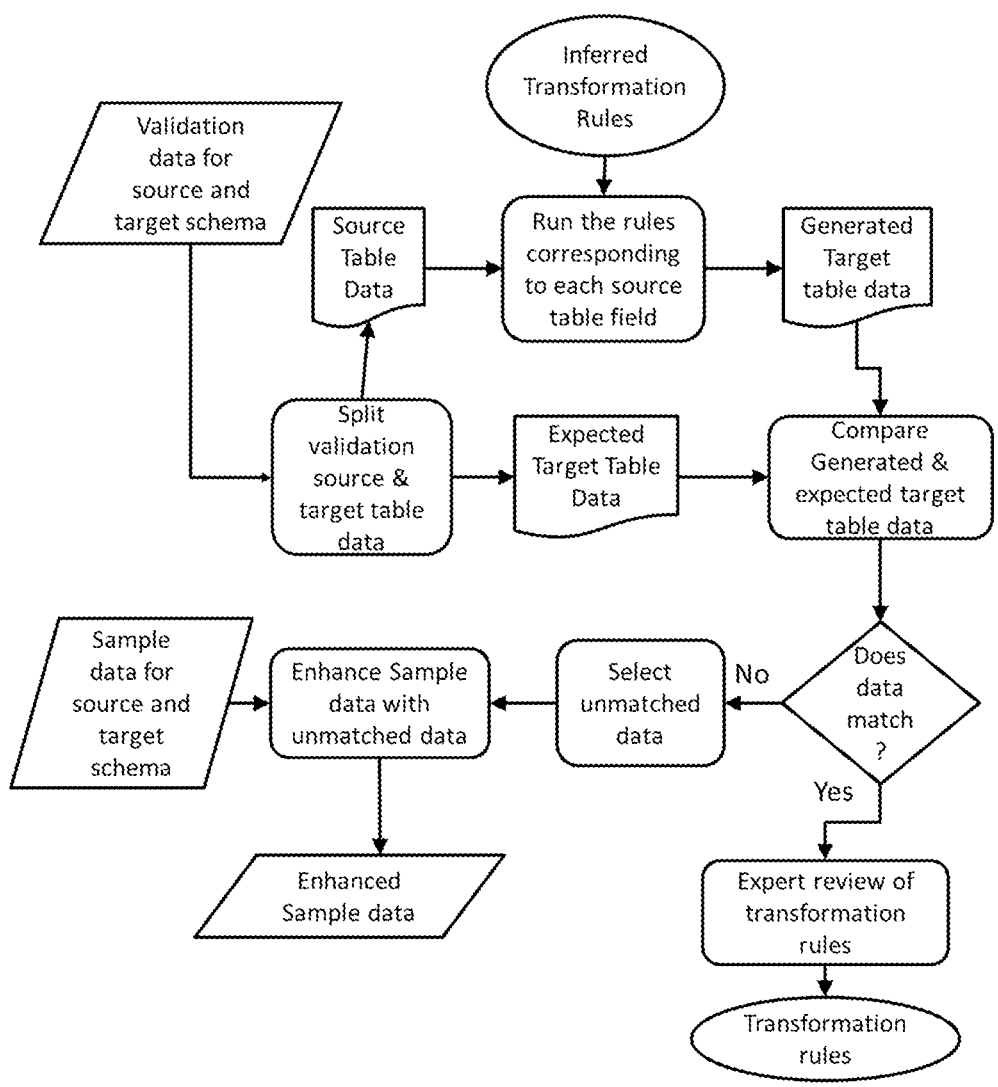
FIG. 6 is flowchart illustrating steps involved in the validation of the set of transformation rules according to some embodiments of the present disclosure.

According to an embodiment of the disclosure, the steps involved in the validation of the set of transformation rules is shown in flowchart of FIG. 6. Validation data for source and target schema is taken as the input. The validation data for source and target schema is then split into two parts, a first part and a second part. The first part is given to run the transformation rules corresponding to each source table field, and a target table data is generated using the final set of transformation rules. The generated target table data is then compared with the expected target tables, and the expected target table is the second part of validation data for source and target schema.

Further, if the generated target table data matches with the expected target table, then a final set of transformation rules are provided as the output. If the generated target table data does not match with the expected target table, then unmatched data is selected, and the set of source-target data samples is enhanced using the set of source-target data samples for source and target schema.

Figure 7A:
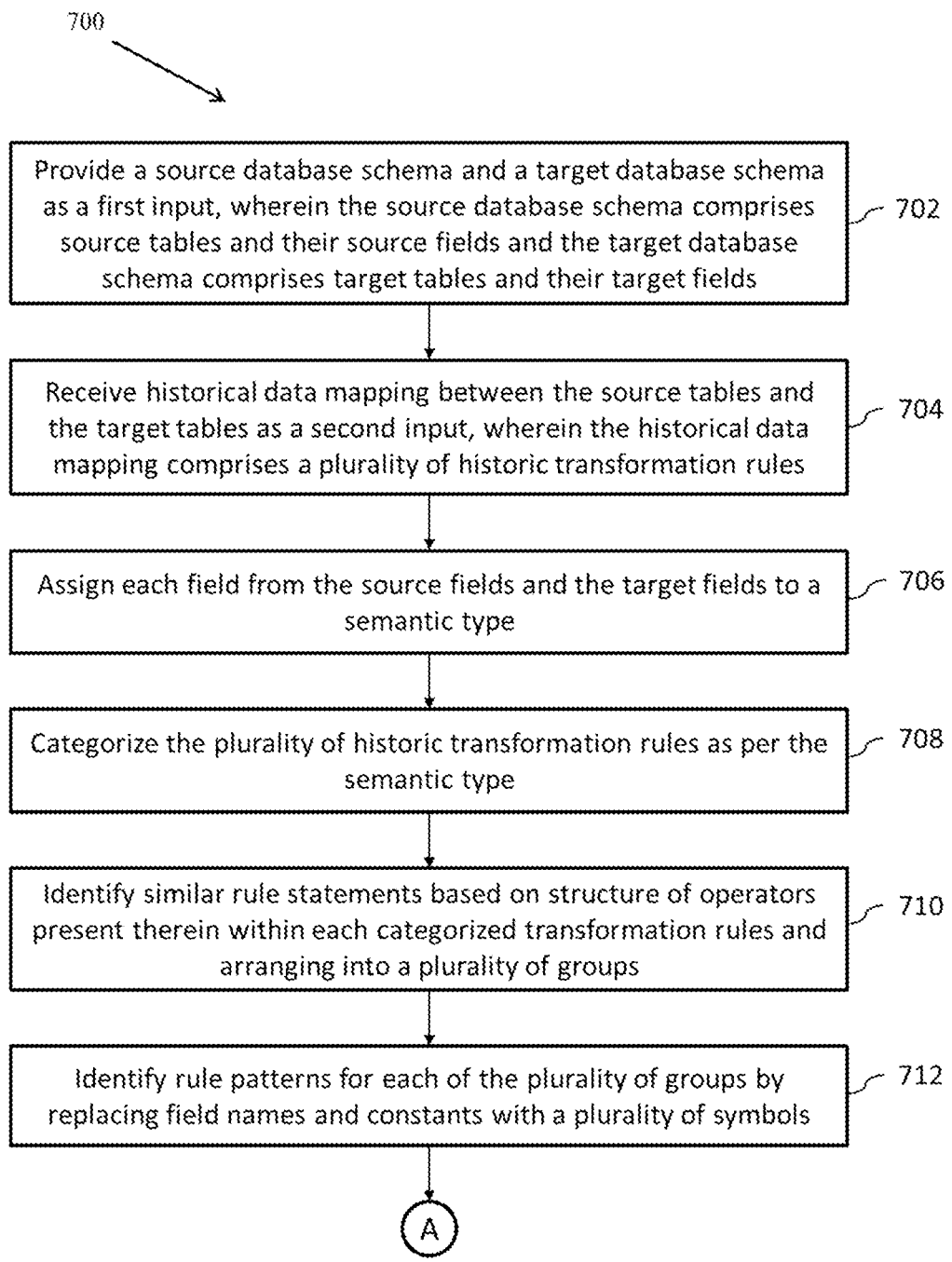
FIGS. 7A-7C is a flowchart of a method for learning based synthesis of data transformation rules according to some embodiments of the present disclosure
Figure 7B:
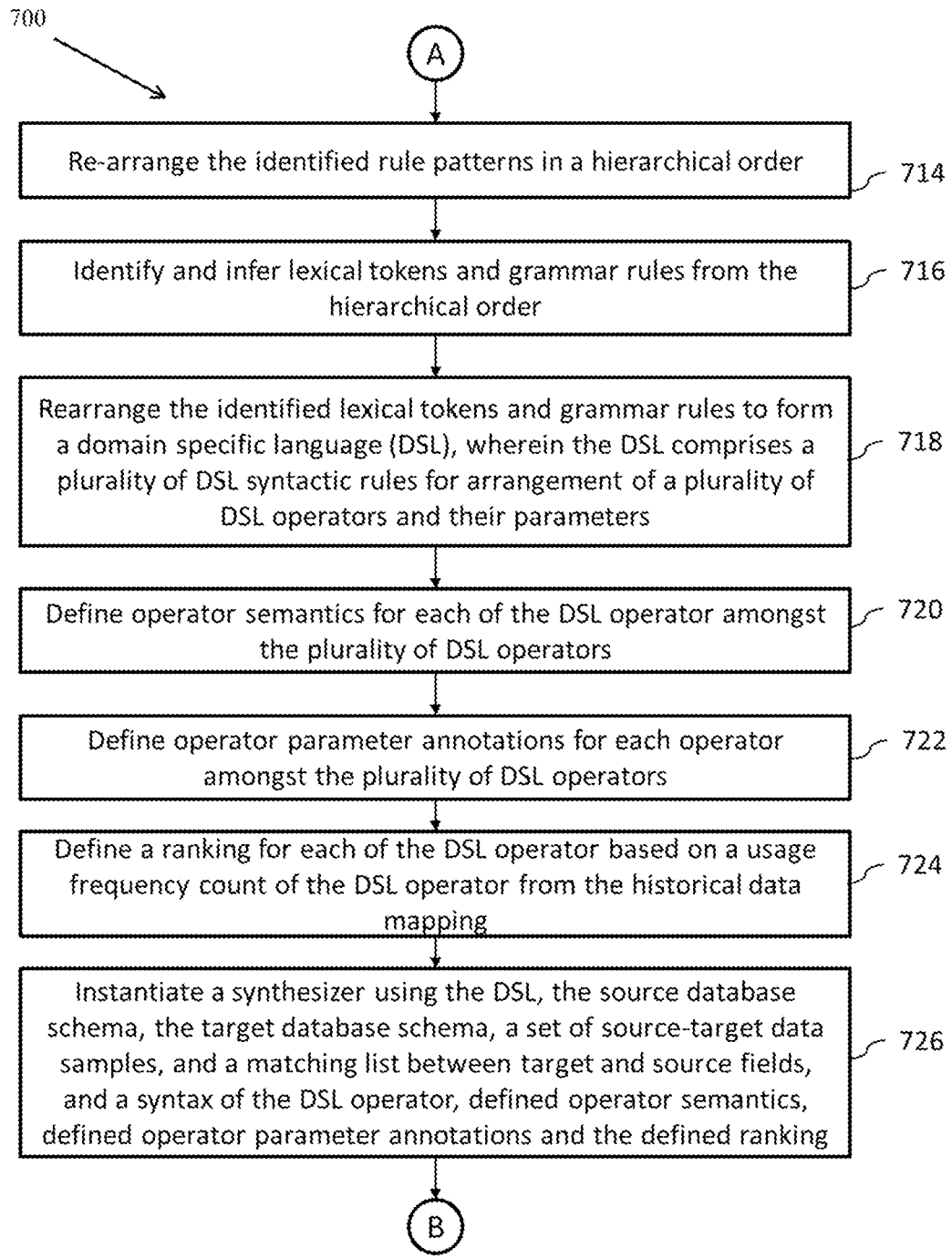
Figure 7C:
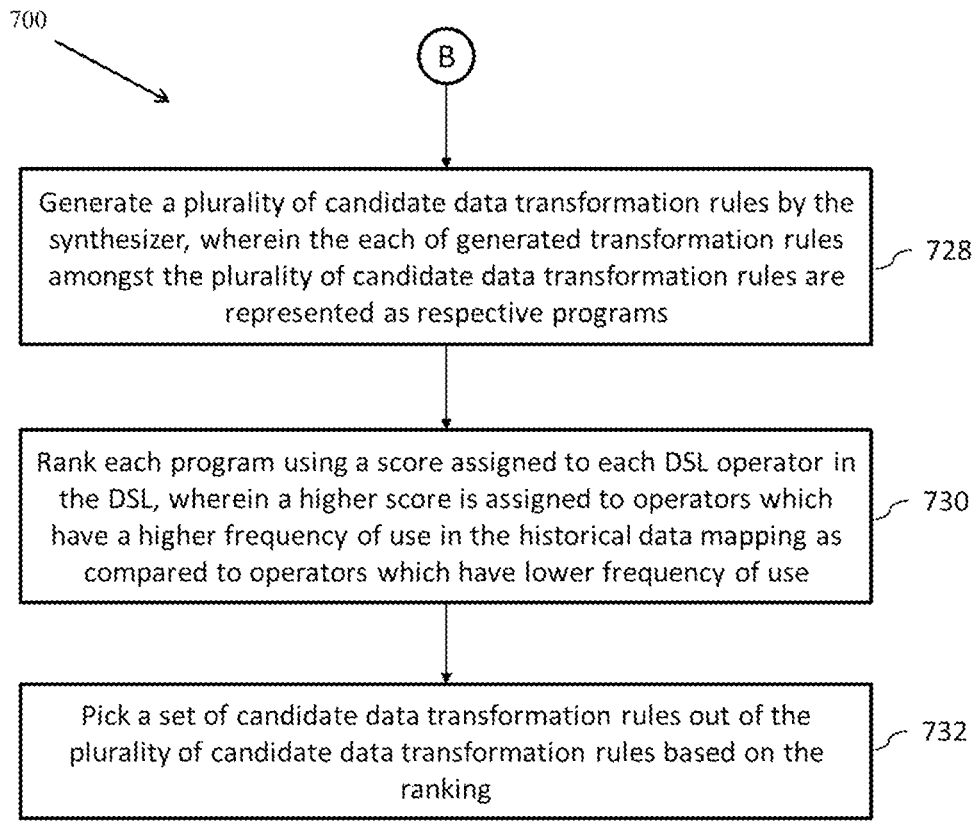

FIG. 7A-7C illustrates a flow chart of a method 700 for analyzing a plurality of data streams in real time, in accordance with an example embodiment of the present disclosure. The method 700 depicted in the flow chart may be executed by a system, for example, the system 100 of FIG. 1. In an example embodiment, the system 100 may be embodied in the computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 700 are described with help of system 100. However, the operations of the method 700 can be described and/or practiced by using any other system.

Initially at step 702 of the method 700, the source database schema and the target database schema are provided as the first input, wherein the source database schema comprises source tables and their source fields and the target database schema comprises target tables and their target fields. At step 704, the historical data mapping between the source tables and the target tables is also received as the second input, wherein the historical data mapping comprises the plurality of historic transformation rules and a matching list between the source fields and the target fields.

In the next step 706, each field from the source fields and the target fields are assigned to the semantic type. At step 708, the plurality of historic transformation rules is categorized as per the semantic type. Further at step 710, similar rule statements are identified based on structure of operators present therein within each categorized transformation rules and arranging into a plurality of groups. At step 712, rule patterns are identified for each of the plurality of groups by replacing field names and constants with a plurality of symbols. In the next step 714, the identified rule patterns are rearranged in a hierarchical order. Further at step 716, lexical tokens and grammar rules are identified and inferred from the hierarchical order.

At step 718, the identified lexical tokens and grammar rules are then rearranged to form a set of domain specific language (DSL) and the set of DSLs comprises a plurality of DSL syntactic rules for arrangement operators and their parameters.

At step 720, operator semantics are defined for each of the DSL operator amongst the plurality of DSL operators. Similarly, at step 722, operator parameter annotations are defined, wherein the operator parameter annotations are configured to assist in rule inferencing, for each operator amongst the plurality of DSL operators. At step 724, a ranking is defined for each of the DSL operator based on a usage frequency count of the DSL operator from the historical data mapping.

Further at step 726, the synthesizer is instantiated using the DSL, the source database schema, the target database schema, a set of source-target data samples, and a matching list between target and source fields, and a syntax of the DSL operator, defined operator semantics, defined operator parameter annotations and the defined ranking. At step 728, the plurality of candidate data transformation rules is generated by the synthesizer, wherein the each of generated transformation rules amongst the plurality of candidate data transformation rules are represented as respective programs. In the next step 730, each program is ranked using a score assigned to each DSL operator in the DSL, wherein a higher score is assigned to operators which have a higher frequency of use in the historical data mapping as compared to operators which have lower frequency of use. Finally, at step 732, a set of candidate data transformation rules is picked out of the plurality of candidate data transformation rules based on a top user-defined number of rankings.

Experimental Results

According to an embodiment of the disclosure, the system 100 can also be explained with the help of experimental results. The system 100 was tested with real industrial data from the insurance domain. From a large target schema with more than 3000 fields spread across 200 tables. 236 core fields of target schema were focused. Two real source schemas were considered, Source 1 with 1396 fields, and Source 2 with 9598 fields. For rule generation evaluation, the gold standard transformation rules were used for all the 236 core fields from target schema.

Results of Rule Generator

For both the source and target schemas, 100 rows of data were used, out of which 4 rows were used in rule generation and the remaining for the validation. The generated rule is precise when it is logically equivalent to the rule in the gold standard. Two types of experiments were conducted. In the first experiment (E1), field matches output from schema matching task were considered. For this experiment, for every target field, the top 5 field matches were considered. In the second experiment (E2), the field matchings from the golden standard were considered.

Table I shows the experimental results. In this table, Col. A shows the experiment, Col. B shows the number of target fields for which rules have been generated, Col. C shows number of precise rules that are generated, and Col. D shows the Recall score at 2, i.e., precise rules appearing in the first two ranks of the generated rules.

TABLE I

Evaluation of Rule Generator (RG). Experiment E1 is conducted with top-5 matchings from Schema matching task and experiment E2 is conducted with gold standard matchings

| Experiment (A) | Number of rules | | |
| --- | --- | --- | --- |
| | Generated (B) | Precise (C) | Recall at 2 (D) |
| E1 (Top-5) | 214 | 191 | 0.81 |
| E2 | 232 | 227 | 0.96 |

The experiments show that the rule generator has high precision. It has generated a concise number of rules for a given field along with a high recall@2 score. The generated rules were manually examined for 100 target fields and found that they are easy to comprehend. Clearly, rule generation is sensitive to correct matching. Out of the 236 fields, the rule generator generated precise rules for 191 target fields in E1, whereas with the gold standard matches (E2), the system 100 has generated 227 precise rules. This efficiency is highly promising.

Though experiment was on a small number of fields from a large target system, these are marked as business critical fields. While transformation for a small volume of data was evaluated using the transformation rules, this data is a representative sample of the system. Currently, the present experiments are limited to 1:1 and M:1 matching, however the rule generator is capable of generating rules for 1:M and M:N matching scenarios.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem related generation of data transformation rules specification such as effort intensive, manual, knowledge intensive, and expert driven process. The embodiment thus provides a method and a system for learning based synthesis of data transformation rules.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for learning-based synthesis of data transformation rules, the method comprising:
    providing, via one or more hardware processors, a source database schema and a target database schema as a first input, wherein the source database schema comprises source tables and respective source fields and the target database schema comprises target tables and respective target fields;
    receiving, via the one or more hardware processors, historical data mapping between the source tables and the target tables as a second input, wherein the historical data mapping comprises a plurality of historic transformation rules and a matching list between the source fields and the target fields;
    assigning, via the one or more hardware processors, each field from the source fields and the target fields to a semantic type;
    categorizing, via the one or more hardware processors, the plurality of historic transformation rules as per the semantic type;
    identifying, via the one or more hardware processors, similar rule statements based on structure of operators present therein within each categorized transformation rules and arranging into a plurality of groups;
    identifying, via the one or more hardware processors, rule patterns for each of the plurality of groups by replacing field names and constants with a plurality of symbols;
    re-arranging, via the one or more hardware processors, the identified rule patterns in a hierarchical order;
    identifying and inferring, via the one or more hardware processors, lexical tokens and grammar rules from the hierarchical order;
    rearranging, via the one or more hardware processors, the identified lexical tokens and grammar rules to form a set of domain specific languages (DSL), wherein the set of DSLs comprises a plurality of DSL syntactic rules for arrangement of a plurality of DSL operators and their parameters;
    defining, via the one or more hardware processors, operator semantics for each of the DSL operator amongst the plurality of DSL operators;
    defining, via the one or more hardware processors, operator parameter annotations configured to assist in rule inferencing, for each operator amongst the plurality of DSL operators;
    defining, via the one or more hardware processors, a ranking for each of the DSL operator based on a usage frequency count of the plurality of DSL operators from the historical data mapping;
    instantiating, via the one or more hardware processors, a synthesizer using
        the set of DSLs, the source database schema, the target database schema, a set of source-target data samples, and a matching list between target and source fields, and
        a syntax of the DSL operator, defined operator semantics, defined operator parameter annotations and the defined ranking;
    generating, via the one or more hardware processors, a plurality of candidate data transformation rules by the synthesizer, wherein the each of generated transformation rules amongst the plurality of candidate data transformation rules are represented as respective programs;
    ranking, via the one or more hardware processors, each program using a score assigned to each DSL operator in the set of DSLs, wherein a higher score is assigned to operators which have a higher frequency of use in the historical data mapping as compared to operators which have lower frequency of use; and
    selecting, via the one or more hardware processors, a set of candidate data transformation rules out of the plurality of candidate data transformation rules based on a top user-defined number of rankings.

2. The method of claim 1 further comprising validating the set of candidate data transformation rules as follows:
    receiving validation data for source and target schema;
    splitting the validation data for source and target schema into a first part and a second part;
    providing the first part to run the transformation rules corresponding to each source table field;
    generating a target table data using the set of candidate transformation rules;
    comparing the generated target table data with an expected target table data, wherein the expected target table is the second part;
    generating a final set of transformation rules, if the generated target table data matches with the expected target table date; and
    selecting the unmatched data to enhance the set of source-target data samples, if the generated target table data does not match with the expected target table data.

3. The method of claim 1 wherein one or more semantic types are 15, wherein the semantic type is a representation of a set of values related to a business domain concept.

4. The method of claim 1, wherein the lexical tokens and grammar rules are identified in a bottom-up manner.

5. A system for learning-based synthesis of data transformation rules, the system comprises:
    an input/output interface for providing a source database schema and a target database schema as a first input, wherein the source database schema comprises source tables and respective source fields and the target database schema comprises target tables and respective target fields;
one or more hardware processors;
a memory in communication with the one or more hardware processors, wherein the one or more first hardware processors are configured to execute programmed instructions stored in the one or more first memories, to:
   receive historical data mapping between the source tables and the target tables as a second input, wherein the historical data mapping comprises a plurality of historic transformation rules and a matching list between the source fields and the target fields;
   assign each field from the source fields and the target fields to a semantic type;
   categorize the plurality of historic transformation rules as per the semantic type;
   identify similar rule statements based on structure of operators present therein within each categorized transformation rules and arranging into a plurality of groups;
   identify rule patterns for each of the plurality of groups by replacing field names and constants with a plurality of symbols;
   re-arrange the identified rule patterns in a hierarchical order;
   identify and infer lexical tokens and grammar rules from the hierarchical order;
   rearrange the identified lexical tokens and grammar rules to form a set of domain specific languages (DSL), wherein the set of DSLs comprises a plurality of DSL syntactic rules for arrangement of a plurality of DSL operators and their parameters;
   define operator semantics for each of the DSL operator amongst the plurality of DSL operators;
   define operator parameter annotations configured to assist in rule inferencing, for each operator amongst the plurality of DSL operators;
   define a ranking for each of the DSL operator based on a usage frequency count of the plurality of DSL operators from the historical data mapping;
   instantiate, a synthesizer using
      the set of DSLs, the source database schema, the target database schema, a set of source-target data samples, and a matching list between target and source fields, and
      a syntax of the DSL operator, defined operator semantics, defined operator parameter annotations and the defined ranking;
   generate a plurality of candidate data transformation rules by the synthesizer, wherein the each of generated transformation rules amongst the plurality of candidate data transformation rules are represented as respective programs;
   rank each program using a score assigned to each DSL operator in the set of DSLs, wherein a higher score is assigned to operators which have a higher frequency of use in the historical data mapping as compared to operators which have lower frequency of use; and
   select a set of candidate data transformation rules out of the plurality of candidate data transformation rules based on a top user-defined number of rankings.

6. The system of claim 5 further configured to validate the set of candidate data transformation rules as follows:
   receiving validation data for source and target schema;
   splitting the validation data for source and target schema into a first part and a second part;
   providing the first part to run the transformation rules corresponding to each source table field;
   generating a target table data using the set of candidate transformation rules;
   comparing the generated target table data with an expected target table data, wherein the expected target table is the second part;
   generating a final set of transformation rules, if the generated target table data matches with the expected target table date; and
   selecting the unmatched data to enhance the set of source-target data samples, if the generated target table data does not match with the expected target table data.

7. The system of claim 5, wherein one or more semantic types are 15, wherein the semantic type is a representation of a set of values related to a business domain concept.

8. The system of claim 5, wherein the lexical tokens and grammar rules are identified in a bottom-up manner.

9. One or more non-transitory machine-readable information storage mediums comprising one or more instructions which when executed by one or more hardware processors cause:
   providing, a source database schema and a target database schema as a first input, wherein the source database schema comprises source tables and respective source fields and the target database schema comprises target tables and respective target fields;
   receiving, via the one or more hardware processors, historical data mapping between the source tables and the target tables as a second input, wherein the historical data mapping comprises a plurality of historic transformation rules and a matching list between the source fields and the target fields;
   assigning, via the one or more hardware processors, each field from the source fields and the target fields to a semantic type;
   categorizing, via the one or more hardware processors, the plurality of historic transformation rules as per the semantic type;
   identifying, via the one or more hardware processors, similar rule statements based on structure of operators present therein within each categorized transformation rules and arranging into a plurality of groups;
   identifying, via the one or more hardware processors, rule patterns for each of the plurality of groups by replacing field names and constants with a plurality of symbols;
   re-arranging, via the one or more hardware processors, the identified rule patterns in a hierarchical order;
   identifying and inferring, via the one or more hardware processors, lexical tokens and grammar rules from the hierarchical order;
   rearranging, via the one or more hardware processors, the identified lexical tokens and grammar rules to form a set of domain specific languages (DSL), wherein the set of DSLs comprises a plurality of DSL syntactic rules for arrangement of a plurality of DSL operators and their parameters;
   defining, via the one or more hardware processors, operator semantics for each of the DSL operator amongst the plurality of DSL operators;
   defining, via the one or more hardware processors, operator parameter annotations configured to assist in rule inferencing, for each operator amongst the plurality of DSL operators;

defining, via the one or more hardware processors, a ranking for each of the DSL operator based on a usage frequency count of the plurality of DSL operators from the historical data mapping;

instantiating, via the one or more hardware processors, a synthesizer using
- the set of DSLs, the source database schema, the target database schema, a set of source-target data samples, and a matching list between target and source fields, and
- a syntax of the DSL operator, defined operator semantics, defined operator parameter annotations and the defined ranking;

generating, via the one or more hardware processors, a plurality of candidate data transformation rules by the synthesizer, wherein the each of generated transformation rules amongst the plurality of candidate data transformation rules are represented as respective programs;

ranking, via the one or more hardware processors, each program using a score assigned to each DSL operator in the set of DSLs, wherein a higher score is assigned to operators which have a higher frequency of use in the historical data mapping as compared to operators which have lower frequency of use; and selecting, via the one or more hardware processors, a set of candidate data transformation rules out of the plurality of candidate data transformation rules based on a top user-defined number of rankings.

* * * * *